R. T. SUTTON.
Grain Drier.
No. 41,028.                           Patented Dec. 22, 1863.
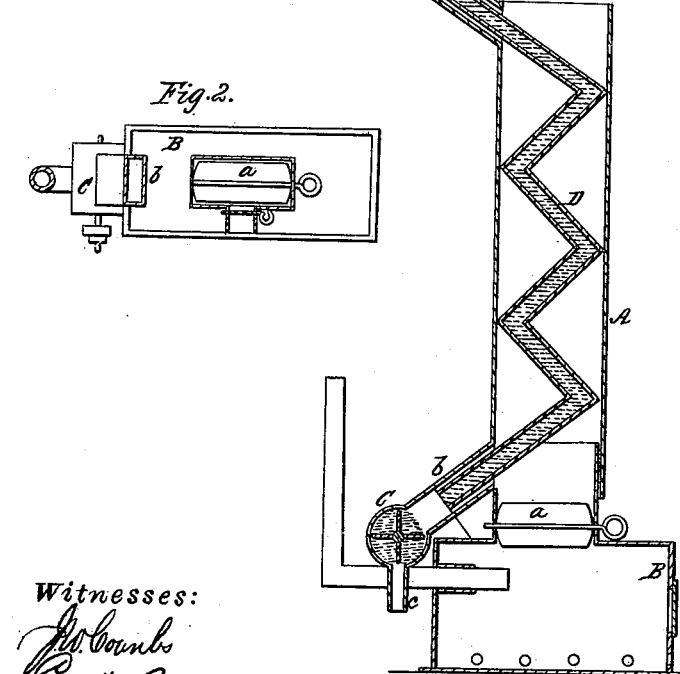
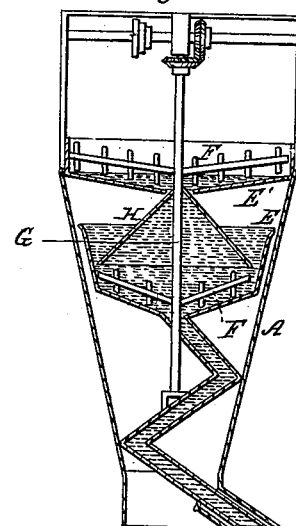
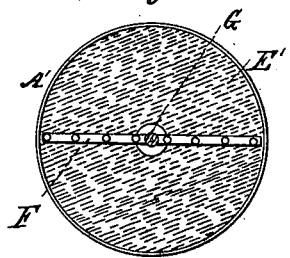
Witnesses:
Inventor:

UNITED STATES PATENT OFFICE.

R. T. SUTTON, OF ROCHESTER, NEW YORK.

IMPROVEMENT IN GRAIN-DRIERS.

Specification forming part of Letters Patent No. 41,028, dated December 22, 1863.

*To all whom it may concern:*

Be it known that I, R. T. SUTTON, of Rochester, in the county of Monroe and State of New York, have invented a new and Improved Grain-Drier; and I do hereby declare that the following is a full, clear, and exact description of the same, reference being had to the accompanying drawings, forming a part of this specification, in which—

Figure 1 represents a longitudinal vertical central section of my invention. Fig. 2 is a horizontal section of the same. Fig. 3 is a plan or top view of the same.

Similar letters of reference in the three views indicate corresponding parts.

This invention relates to a grain drying apparatus in which the grain is passed through a zigzag channel made of sheet metal, and arranged in such relation to a furnace and fan-blower that it can be exposed to the direct action of the hot air rising from the fire or to a current of air forced in by the action of the fan-blower, or to both combined.

In order to effect the drying of very wet grain, two or more dishes, with inclined bottoms and made of perforated sheet metal, are combined with the zigzag channel, each of said dishes being provided with a rotary stirrer in such a manner that the grain is exposed to the current of air in thin layers previous to its passing into and through the zigzag channel.

To enable others skilled in the art to make and use my invention, I will proceed to describe it.

A represents a tower, built up of brick, wood, or any other suitable material or materials, and in any desirable shape. This tower is set upon or connected with a furnace, B, so that the hot air rising from the fire in said furnace passes up through it, a damper, *a*, being provided in such a position that the current of hot air passing up through the tower can be regulated at pleasure. A spout, *b*, projecting from the lower part of the tower A, connects with a fan-blower, C, which is to be used in cooling the grain and in forcing the air through the tower. The interior of the tower is occupied by a zigzag channel or tube, D, which is made of perforated sheet metal, so as to allow the air to pass freely through it. A suitable hopper may be placed on the top end of this channel to introduce the grain to be dried, and said channel terminates below in the spout *b*, leading to the fan blower, as clearly shown in Fig. 1 of the drawings.

If the apparatus is to be used for very wet grain, the channel D is continued up into an additional tower, A', and made to connect with a series of disks, E E', which occupy the upper part of the tower A'. These disks are made of perforated sheet metal with inclined bottoms, and they are provided with stirrers F, which are secured to a rotary shaft, G. The grain on being introduced into the upper disk, E', is spread by the stirrer on the perforated bottom of said disk, thus being exposed to the current of air in thin layers, and it is allowed to pass slowly down over the conical perforated apron H into the second disk, E, where it is again spread on the bottom by the action of the stirrer, and whence it passes gradually down into zigzag channel D. While passing through the disks E E', the grain is sufficiently dried to allow it to pass through the channel D without clogging. In passing through the disks E E', and finally through the channel, the grain is exposed to the current of hot air rising from the furnace and forced in by the fan-blower, and it is discharged through the tube *c* perfectly dry and free from moisture.

What I claim as new, and desire to secure by Letters Patent, is—

1. The combination of the perforated zigzag channel D, tower A, hot-air furnace B, and fan-blower C, all arranged in relation to each other and operating in the manner and for the purpose substantially as shown and described.

2. The perforated disks E E', with inclined bottoms, and provided with stirrers F, in combination with the towers A A', zigzag channel D, and hot-air furnace B, constructed and operating substantially as and for the purposes set forth.

R. T. SUTTON.

Witnesses:
 E. B. WHEELER,
 J. S. BRIEN.